Figure 1:
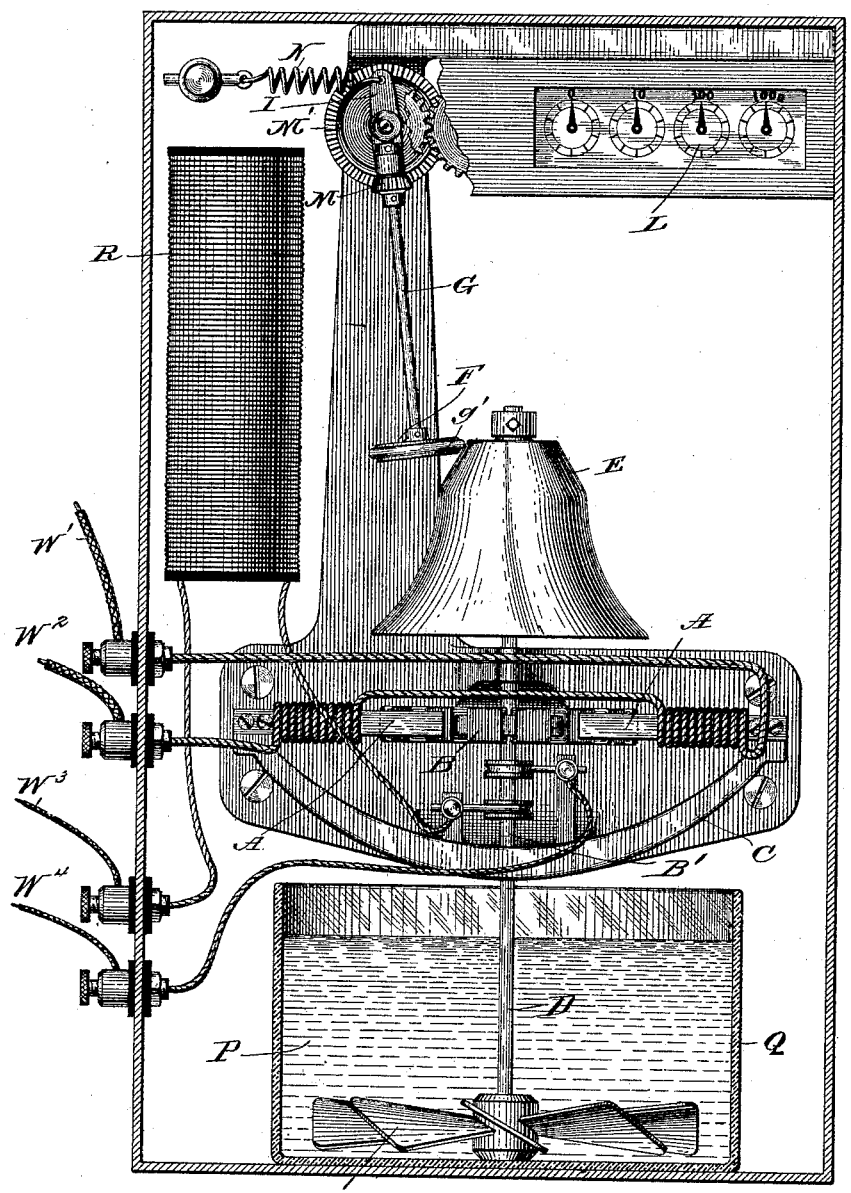

(No Model.) 3 Sheets—Sheet 1.

W. K. FREEMAN.
ELECTRIC METER.

No. 452,936. Patented May 26, 1891.

Witnesses
John F. Nelson.
Lillie Hanna

Inventor
Walter K. Freeman
By Church & Church
his Attys.

(No Model.) 3 Sheets—Sheet 3.

W. K. FREEMAN.
ELECTRIC METER.

No. 452,936. Patented May 26, 1891.

Witnesses
John F. Nelson
Lillie Hanna

Inventor
Walter K. Freeman
By Church & Church
his Attys.

UNITED STATES PATENT OFFICE.

WALTER K. FREEMAN, OF BROOKLYN, NEW YORK, ASSIGNOR TO WILLIAM S. HADAWAY, JR., TRUSTEE, OF BOSTON, MASSACHUSETTS.

ELECTRIC METER.

SPECIFICATION forming part of Letters Patent No. 452,936, dated May 26, 1891.

Application filed January 13, 1891. Serial No. 377,666. (No model.)

*To all whom it may concern:*

Be it known that I, WALTER K. FREEMAN, of Brooklyn, in the county of Kings and State of New York, have invented certain new and useful Improvements in Electric Meters; and I do hereby declare the following to be a full, clear, and exact description of the same, reference being had to the accompanying drawings, forming a part of this specification, and to the letters of reference marked thereon.

The object of this invention is to measure and record by electro-mechanical means the current flowing through a given electric circuit.

The principle of the invention will be understood from the following: If a given electric motor is connected into an electric circuit and a predetermined current is caused to flow in said circuit, the armature of such motor will be given a certain rate of revolution, and if more current is caused to flow through the circuit the rate of revolution will be increased. This increase in rate of revolution of the armature is not, however, directly proportional to the increase of current flowing, but varies to a considerable degree, and if a curve be developed, indicating the performance of the motor under the influence of an increasing current, it will be found to be an irregular one.

In carrying out my invention I connect in the circuit whose current it is desired to measure and record a motor, and I cause the motion of the armature of said motor to be communicated to a form bearing the characteristic curve developed by observing the performance of the motor under an increasing current and cause said form, when actuated by the revolutions of the armature, to operate upon a suitable recording mechanism, whose reading at any time will indicate correctly the amount of current that has flowed in the circuit.

There are various ways of putting my invention into practice; but I deem it necessary to describe but one of them, as follows: To the armature of the motor I connect a shaft or spindle in such manner that said shaft shall be caused to revolve when the armature revolves and yet be free to move longitudinally independently of the armature. Upon one end of this shaft I mount a form that is circular in cross-section at any point, but whose contour longitudinally corresponds to the characteristic curve developed by observing the performance of the motor, as above stated, and I arrange for co-operation with said form a friction-wheel mounted upon a shaft which drives a suitable recording mechanism and kept in frictional contact with the form by means of a spring, weight, or other suitable contrivance. Upon the other end of the shaft that is connected to the armature I mount a propeller-wheel, which, preferably, is adapted to operate in a vessel containing some homogeneous liquid, though it may operate in the air simply. With an arrangement such as this, when the armature of the motor is put into rotation by the passage of the current in the circuit in which it is interposed, the shaft or spindle carrying the form and the propeller-wheel is caused to rotate, and by reason of the resistance offered by the liquid or fluid in which the propeller operates the said shaft or spindle is caused to rise more or less, according to the rapidity with which the armature is caused to revolve, thereby bringing the appropriate portions of the form successively into rotative contact with the friction-wheel and causing the latter to revolve more or less rapidly, according to the diameter of the form at the point or points where it makes contact, and advancing the connected recording mechanism accordingly. Any diminution in the current passing will of course produce less rapid revolution of the armature and cause the shaft bearing the form to descend by gravity, so as to bring a portion of the form having a less diameter into co-operation with the transfer friction-wheel, and thereby decrease the speed of the latter and of the connected train of the recording mechanism.

I have not deemed it necessary to herein describe the details of the process of developing the characteristic curve of the motor, because, given the result to be illustrated, no difficulty will be found in developing the curve by those skilled in such matters by following the general directions herein indicated.

I do not intend, of course, to limit myself to the form or special construction of the instrumentalities herein shown and described, for it is evident that the characteristic curve when once obtained can be applied to either reciprocating or rotating parts, operated by the motion of the armature, in a variety of ways.

Any form of mechanism for transferring the motion of the part upon which the characteristic curve is developed and any suitable recording mechanism in gear with such transfer mechanism may be employed.

Figure 2:
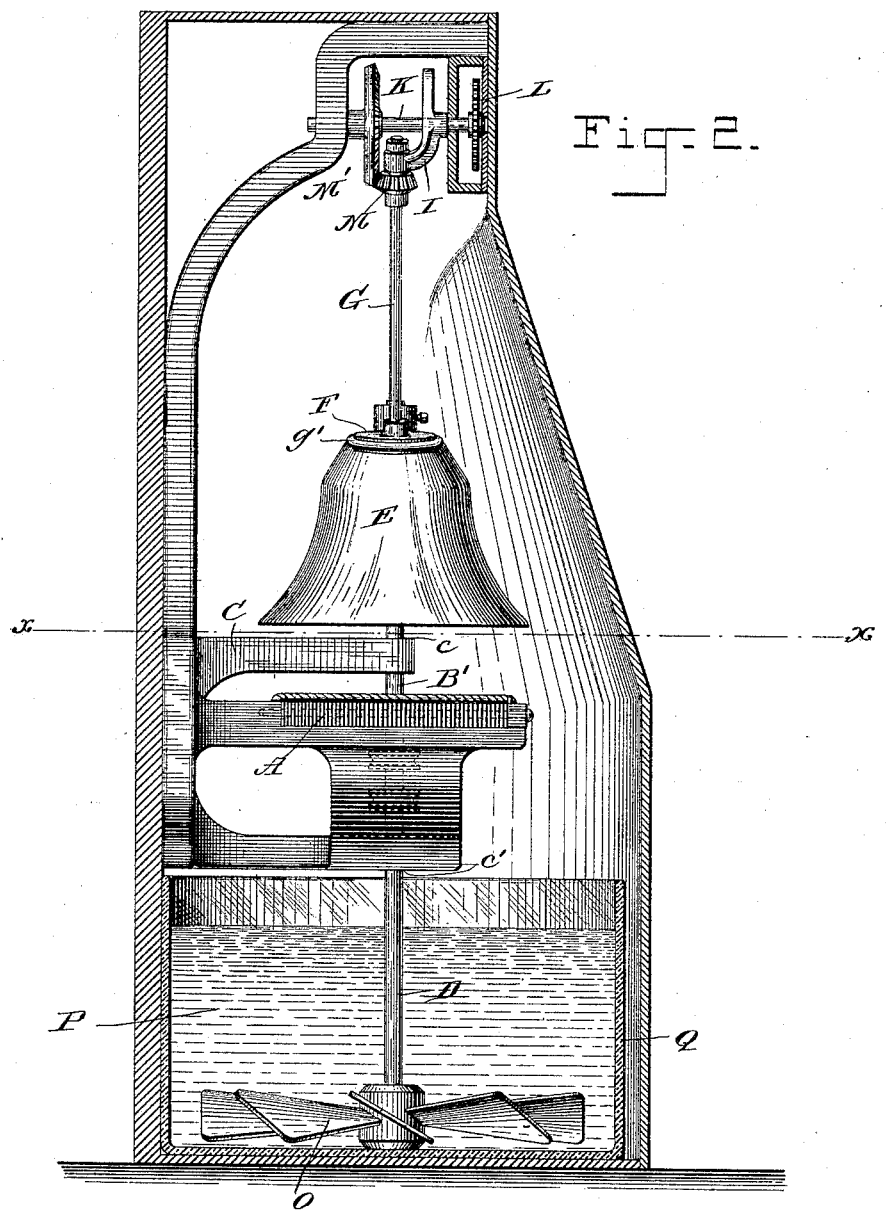
Figure 3:
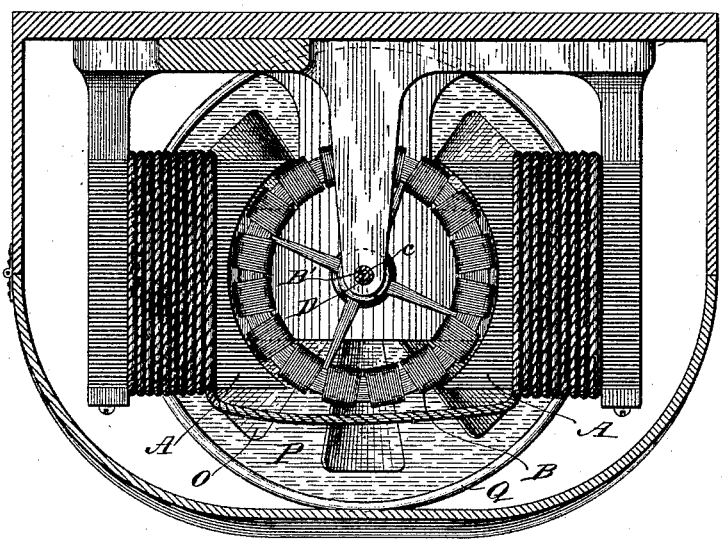
Figure 4:
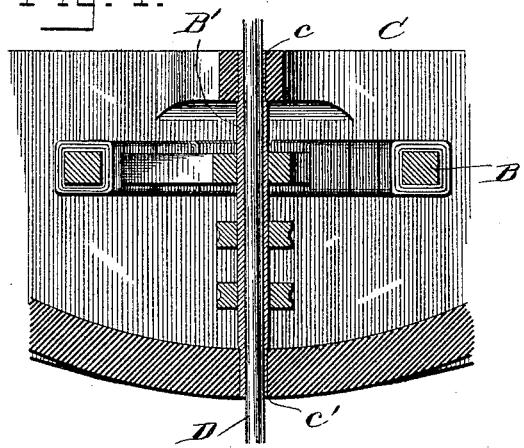
Figure 5:
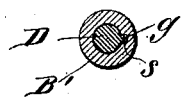

Referring to the accompanying drawings, Figure 1 represents a front elevation, partly in section, of a meter embodying my invention. Fig. 2 is a side elevation of the same, also partly in section. Fig. 3 is a cross-sectional view taken on the line $xx$, Fig. 2. Fig. 4 is a detail view showing particularly the connection between the armature and the shaft or spindle operated thereby. Fig. 5 is a cross-section of the armature shaft and spindle, showing the spline-and-groove connection.

Similar letters of reference in the several figures indicate the same parts.

A represents the field-magnets of an electric motor; B, the armature thereof, mounted upon a tubular shaft $B'$, which has its bearings in a frame-work C at $c\ c'$.

D is a shaft or spindle adapted to work up and down within the tubular armature-shaft $B'$, being connected to the latter by a spline-and-groove connection $s\ g$, which causes the shaft D to rotate when the armature-shaft is rotated, yet permits of a free longitudinal movement of said shaft D independently of the armature-shaft.

Upon the upper end of the shaft D is the form E, whose contour or outline longitudinally corresponds to the characteristic curve of the motor, developed as hereinbefore described. This form is circular in cross-section, and co-operating with it is a friction-wheel F, that is mounted upon a shaft G, whose upper end is journaled in a hanger I, hung loosely upon the driving-shaft K of a recording mechanism L.

A bevel-pinion M is secured upon the shaft G and meshes with a bevel-gear $M'$, fixed to said driving-shaft K.

To the upper arm of the hanger I is connected an adjustable spring N, whose tension is exerted to keep the friction-wheel F constantly in contact with the form E, so that the rotative movements of the latter will be transferred through the friction-wheel to the recording mechanism.

To prevent slipping, the periphery of the wheel G is preferably covered with rubber, as shown at $g'$.

On the lower end of the shaft or spindle D is secured a propeller-wheel O, which preferably operates in some homogeneous liquid P, contained in a vessel Q.

$W'\ W^2\ W^3\ W^4$ are the circuit-conductors, and R a resistance-coil in the branch in which the armature is included.

From the above description the operation of the apparatus will be readily understood.

As the current flows in the circuit the armature will be rotated, and with it the shaft D and the form E thereupon. The rotative motion of the form is transferred by the friction-wheel and the intermediate connections to the recording mechanism. When the current is increased, the armature and shaft D will rotate faster, and under the influence of the propeller-wheel, the said shaft and the form will be raised, so as to bring into co-operative relation with the transfer-wheel F that portion of the form which will cause that increase in the speed of said wheel and that consequent advance of the recording mechanism which is warranted by the increase of current. When the current flowing in the circuit decreases, the form will descend by gravity and bring a portion that is of less diameter into co-operative relation with the transfer-wheel. The curve of the form thus controls the action of the recording mechanism and insures a degree of accuracy not heretofore attained by this kind of apparatus.

Having thus described my invention, what I claim as new is—

1. The herein-described method of measuring and recording electric currents, consisting in ascertaining the characteristic curve of an electric motor, developed by observing the performance of the armature of such motor under the influence of a varying current, applying such characteristic curve to a form, causing said form to partake of the motion of the motor-armature when the latter is actuated by the current to be measured, imparting to said form an independent motion proportioned to the speed of the armature, and operating a recording mechanism by said form, substantially as described.

2. In an electric meter, the combination of a motor and its armature, a form bearing the characteristic curve of the motor, developed by observing the performance of said motor under variations of current, and which form receives motion from the armature of the motor, with recording mechanism, and mechanism for transferring the motion of the form to said recording mechanism, substantially as described.

3. In an electric meter, the combination of a motor and its armature, a rotative form whose contour longitudinally corresponds to the characteristic curve of the motor, developed as herein described, a shaft bearing said form and connected to the armature of the motor so as to rotate therewith and yet be adjustable longitudinally independently thereof, a propeller on said shaft, a recording mechanism, and means substantially such as described, for communicating the motion of the rotative form to said recording mechanism, substantially as described.

4. In the herein-described electric meter, the combination of the motor, the shaft or spindle connected to the armature thereof, a form mounted thereon representing the characteristic curve of the motor and the propeller-wheel, the friction-wheel co-operating with said form, the swinging shaft upon which said friction-wheel is mounted, and recording mechanism geared to said last-mentioned shaft, substantially as described.

WALTER K. FREEMAN.

Witnesses:
W. S. HADAWAY, Jr.,
CHAS. M. WOLCOTT.